United States Patent [19]

Graceffa et al.

[11] Patent Number: 4,474,742

[45] Date of Patent: Oct. 2, 1984

[54] TREATMENT OF ASBESTOS

[75] Inventors: Philip Graceffa, Newtonville; Sigmund A. Weitzman, Newton Centre, both of Mass.

[73] Assignee: Boston Biomedical Research Institute, Inc. & The General Hospital Corporation, Boston, Mass.

[21] Appl. No.: 467,198

[22] Filed: Feb. 17, 1983

[51] Int. Cl.$^3$ .............................................. C01B 33/24
[52] U.S. Cl. ..................................... 423/331; 423/326
[58] Field of Search ................................ 423/331, 326

[56] References Cited

U.S. PATENT DOCUMENTS

| | | | |
|---|---|---|---|
| 2,394,040 | 2/1946 | Caillman | 117/126 |
| 3,535,150 | 10/1970 | Lipsett | 117/100 |
| 3,967,043 | 6/1976 | Otouma et al. | 428/443 |
| 4,137,367 | 1/1979 | Sample, Jr. et al. | 428/443 |
| 4,168,346 | 9/1979 | Pezzoli | 428/443 |
| 4,171,405 | 10/1979 | Pezzoli | 428/443 |
| 4,234,377 | 11/1980 | Pezzoli | 162/3 |
| 4,303,553 | 12/1981 | Aoki et al. | 252/478 |
| 4,309,477 | 1/1982 | Pezzoli | 428/378 |
| 4,328,197 | 5/1982 | Flowers | 423/327 |
| 4,401,636 | 8/1983 | Flowers | 423/327 |

FOREIGN PATENT DOCUMENTS 179066 11/1982 Japan .................................. 423/331

OTHER PUBLICATIONS

Paul G. Stecher, et al., *The Merck Index* Eight Edition, Merck & Co., Inc., Rahway, N.J., 1968, p. 324.

Mossman, B. J., Landesman, J. M., "Importance of Oxygen Free Radicals in Asbestos-Induced Injury to Airway Epithelial Cells," *Chest* May 1983, 83(55uppl), pp. 505–515, ISSN 0012-3692, Contract/Grant No. 00888.

"Biological Autooxidation, I Decontrolled Iron: An Ultimate Carcinogen and Toxicant: An Hypothesis," Kohn S. H., *Medical Hypotheses*, Sep.Oct. 1978, 4(5), pp. 445–471, ISSN-0306-9877.

*Primary Examiner*—John Doll
*Assistant Examiner*—Jackson Leeds

[57] ABSTRACT

Toxicity of asbestos is reduced by treating it with non-mutagenic non-toxic hydroxamic acid iron-chelating agents.

3 Claims, No Drawings

TREATMENT OF ASBESTOS

This invention relates to inhibiting the catalytic effect of asbestos on peroxide reduction and its concomitant toxicity.

The various forms of asbestos, among which are chrysotile, crocidolite, and amosite, have been found to exhibit toxicity toward mammals, particularly when inhaled, in that they produce inflammation, fibrous scarring, and cancer. While it appears that the dimensions of asbestos fibers are important in determining the amount of toxicity produced, the nature of the chemical interaction between asbestos and cells is also important. One feature of the response to inhalation of asbestos fibers is the fiber attachment to and/or engulfment by phagocytic cells, the pulmonary macrophages, with subsequent inflammation. The inflammatory phagocytes reduce oxygen to reactive metabolites such as the superoxide anion radical, hydrogen peroxide, and hydroxyl radical. The hydroxyl radical is a potent oxidizing agent which initiates lipid peroxidation, kills bacteria, damages cellular DNA, and reacts with most organic molecules. This radical is ordinarily generated by stimulated phagocytes in concentrations much lower than those of the other, more stable, reduced oxygen species: superoxide and hydrogen peroxide. While these latter species may be produced by direct enzymatic reduction of oxygen, it is believed that under physiological conditions, generation of hydroxyl radical is a secondary process catalyzed by metals such as iron or copper.

It has now been found that the reduction of hydrogen peroxide to the extremely reactive unstable and toxic hydroxyl radical is catalyzed by asbestos fibers, which contain iron. In addition, the same catalyzed reaction produces as a secondary product the superoxide anion radical.

It has been proposed in Flowers U.S. Pat. No. 4,328,197 to treat asbestos with various metal salts, including iron salts, to reduce its biologically harmful properties by metal-micelle formation. While it has also been disclosed in Pezzoli U.S. Pat. Nos. 4,168,346, 4,171,405, 4,234,377 and 4,309,477 that asbestos, when reacted with various compounds including disodium ethylene diamine tetraacetic acid, is less harmful to living cells, the disodium ethylene diamine tetraacetic acid is said to have no long-term effect.

It has now been found that the catalytic effect of asbestos on peroxide reduction and the concomitant reduction in toxicity of the asbestos can be inhibited or reduced by treatment of the asbestos with a non-mutagenic non-toxic hydroxamic acid iron chelating agents. Although EDTA and its sodium salts have generally been recognized as chelating agents, they are ineffective to inhibit the peroxide catalytic activity of crocidolite, but rather enhance its activity, although they do have an inhibitory effect upon the peroxide catalytic activity of chrysotile.

The present invention comprises the method of inhibiting the peroxide-reduction catalytic activity of asbestos which comprises contacting the asbestos with an aqueous solution containing a non-mutagenic non-toxic hydroxamic acid iron-chelating agent such as desferriferrichromes, desferriferrioxamines, fusarinines, myobactin P, mycelianamide, hadacidin, aspergillic acid, pulcherriminic acid, rhodotarulic acids, and citrate-hydroxamic acids, and salts thereof. Of these, desferriferrioxamines, particularly desferriferrioxamine B, are preferred. While the foregoing hydroxamic acids are all naturally occurring compounds, identical compounds made by chemical synthesis, as in the case of desferriferrioxamine B, can also be used.

The conditions under which the hydroxamic acid iron-chelating agent is brought into contact with the asbestos are not critical; it is usually most convenient to employ an aqueous solution which is from 0.1 to 100 mM with respect to the agent which is sprayed onto or stirred or otherwise mixed with the asbestos in particulate form at approximately room temperature. Higher or lower concentration in the aqueous solution can be successfully employed as well as temperatures from 0° C. to 50° C. or even higher. The minimum effective amount of the iron-chelating agent varies from one specific agent to another and from one specimen of asbestos to another. In general, $10^{-6}$ part by weight of the agent is the minimum amount required for effective treatment of each part by weight of asbestos. If desired the asbestos particles may first be suspended in water after which the iron-chelating agent or a concentrated aqueous solution thereof may be stirred into the aqueous medium.

EXAMPLES

Suspensions of Canadian chrysotile, amosite and crocidolite from U.I.C.C. Reference Standard samples were prepared in deionized distilled water at a concentration of 1 mg/ml and the peroxide reduction catalytic activity of each suspension was determined by electron spin resonance spectroscopy. To each suspension there was added as the spin trapping agent 5,5-dimethyl-1-pyrroline-N-oxide (50 mM) followed by hydrogen peroxide (85 mM). A specimen of each was then placed in a cuvette, and inserted into a Varian E-109 x-band electron spin resonance spectrometer operating at 100 kHz field modulation, 2 gauss modulation amplitude, and microwave power level 10 mW. Control suspensions were also prepared from which the peroxide was omitted. The ESR spectra were recorded three minutes after addition of the hydrogen peroxide with a gain setting of $1.6 \times 10^4$ with a time constant of 0.064 seconds and scanned at a rate of 50 gauss/min. In each case the addition of the hydrogen peroxide to the control caused the appearance of the characteristic spectrum of the hydroxyl radical adduct of the spin trapping agent, as described in Bannister et al., Biochem. Biophys. Acta, Vol. 715, 116–120 (1982). Washing the asbestos repeatedly with water did not significantly affect the hydroxyl radical signal. However, the addition of desferriferrioxamine B (1 μM, mesylate salt) almost completely eliminated the hydroxyl radical signal in each case. Similar results could be obtained employing the other hydroxamic acid iron-chelating agents specified above.

In contrast the addition of ethylene diamine tetraacetic acid (EDTA, 1 μM) to the suspension of crocidolite enhanced the hydroxyl radical signal, particularly after subsequent washing of the crocidolite with water, indicating that the peroxide-reduction catalytic activity of the crocidolite had been increased rather than inhibited by this treatment.

Following treatment of the asbestos with an effective amount of the hydroxamic acid iron-chelating agent of the present invention in aqueous solution the excess solution may be removed, for example by filtration or centrifugation, if desired, and the asbestos may be washed with water and/or dried.

The thus treated asbestos, including crocidolite as well as chrysotile and amosite, has its peroxide-reduction catalytic activity, along with its concomitant toxicity, substantially completely inhibited.

What is claimed is:

1. The method of inhibiting the peroxide-reduction catalytic activity of asbestos selected from the group consisting of chrysotile, amosite and crocidolite which comprises contacting the asbestos with an aqueous solution containing a non-mutagenic non-toxic hydroxamic acid iron-chelating agent.

2. The method as claimed in claim 1 in which said contacting step is carried out at room temperature.

3. The method as claimed in claim 1 in which said iron-chelating agent is desferriferrioxamine B or salt thereof.

* * * * *